March 31, 1942.   A. J. SYROVY   2,277,800
POWER TRANSMISSION
Filed Oct. 19, 1940   3 Sheets-Sheet 1
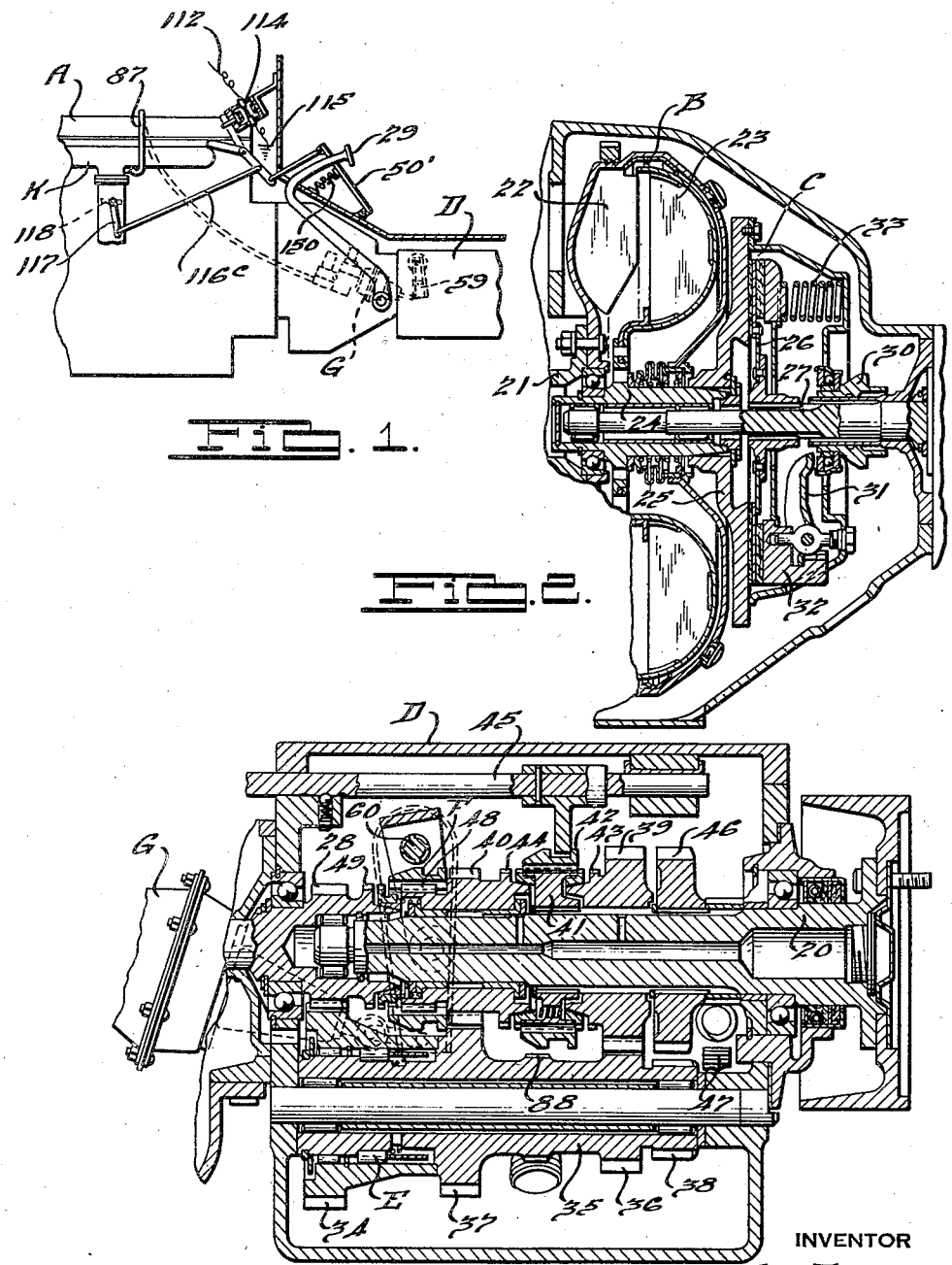
INVENTOR
Augustin J. Syrovy.
BY
Harness, Dind, Pate & Harris
ATTORNEYS.

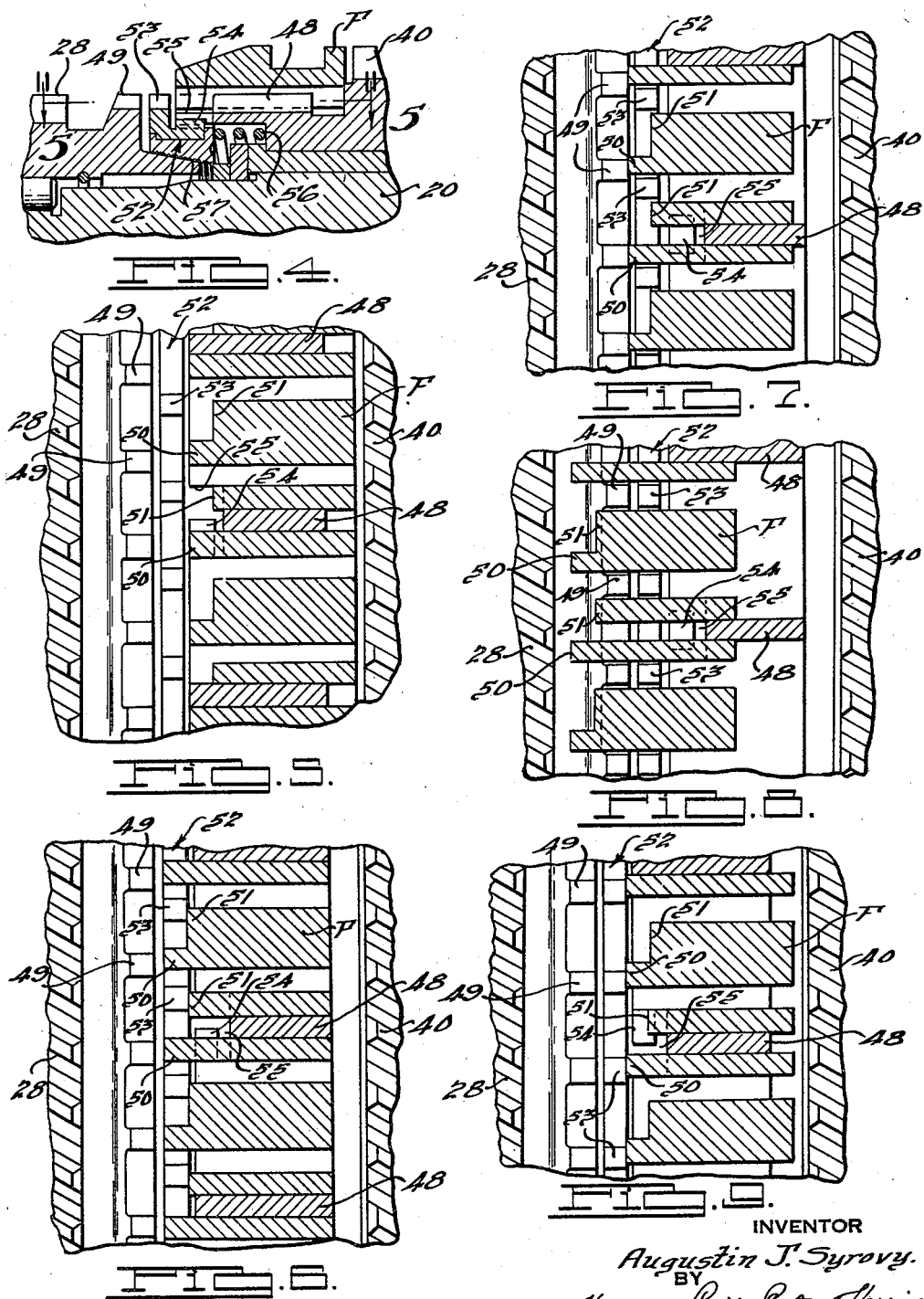

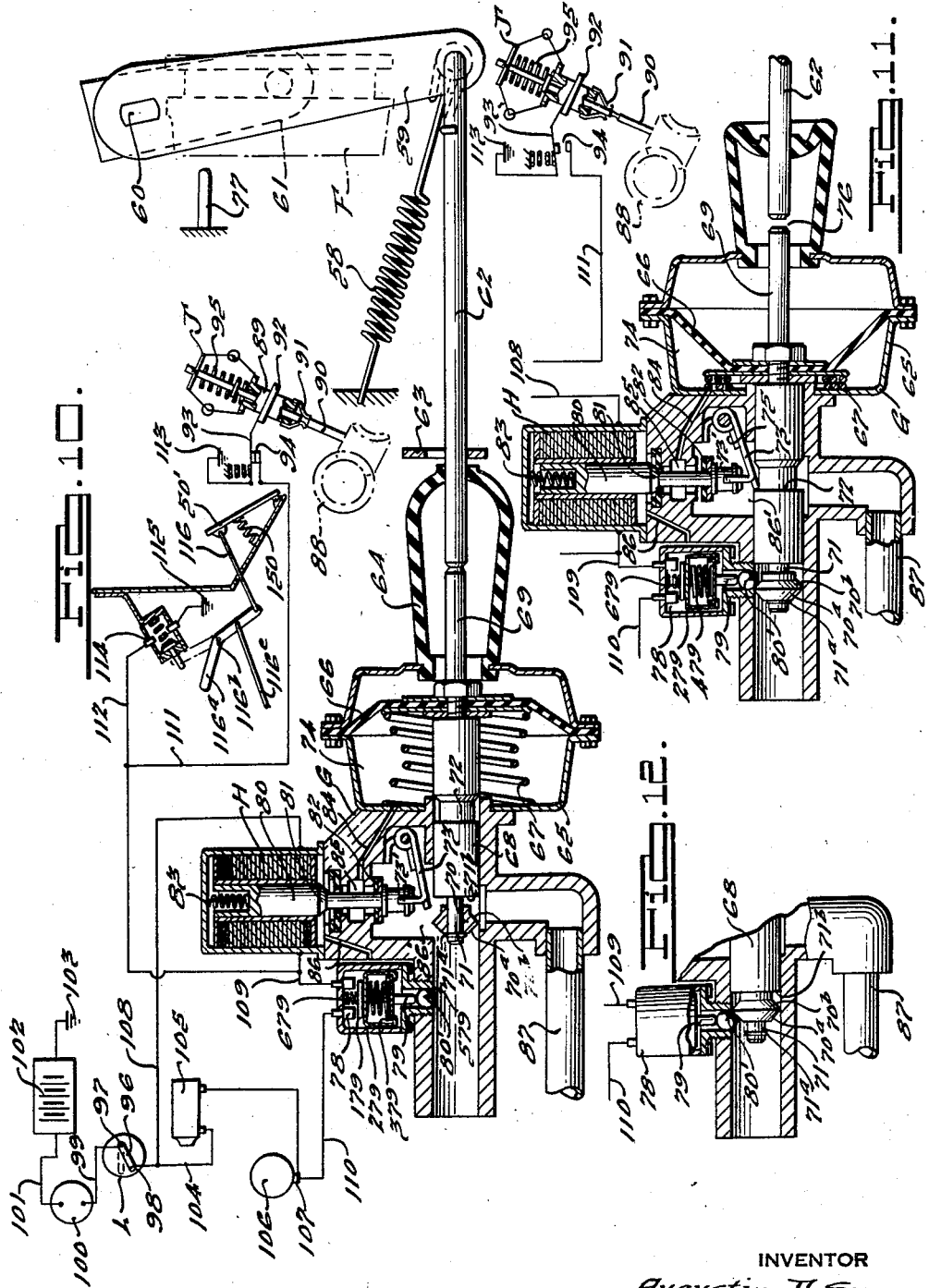

Patented Mar. 31, 1942

2,277,800

UNITED STATES PATENT OFFICE 2,277,800

POWER TRANSMISSION

Augustin J. Syrovy, Detroit, Mich., assignor to Chrysler Corporation, Highland Park, Mich., a corporation of Delaware Application October 19, 1940, Serial No. 361,917

19 Claims. (Cl. 74—472)

This invention relates to motor vehicles and refers more particularly to power transmission and control mechanism therefor.

My invention has particular reference to transmission systems in which the engine ignition is momentarily interrupted in order to unload positively engageable drive control elements so as to facilitate disengagement of such elements. One example of such a transmission is described and claimed in the copending application of Carl A. Neracher et al., Serial No. 335,310, filed May 15, 1940. In such transmission systems, the engine ignition sometimes is grounded beyond the desired momentary period either as a characteristic of the transmission control mechanism, because of failure of the mechanism to properly function, or for other reasons. When the ignition system is thus interrupted, usually by grounding the same, the engine is rendered inoperative so that the car cannot be driven under its own power, or the change speed mechanism does not function properly.

In transmissions of the aforesaid type one drive control element is usually movable or shiftable relative to the other by operable connection with a follower member. A leader member applies thrust to the follower member for effecting disengagement of the drive control members. In order that the drive control members may be disengaged the leader and follower members have a lost-motion connection such that the engine ignition system is interrupted when the leader member takes up this lost motion which it may do without requiring disengaging shift of the movable drive control member. Now, if, for any reason, the leader member does not continue its travel and cause the follower member to release the movable drive control member, then the ignition remains grounded thereby rendering the engine inoperative. This invention provides means for automatically restoring operation of the ignition system under the circumstances outlined above even though the follower member fails to operate as it should.

It is a further object of my invention to provide means for remedying the foregoing difficulties whereby the engine ignition is automatically restored even though the drive control elements are not disengaged during the engine interruption.

Another object is to provide a simple and effective means for guarding against the possibility of the transmission mechanism functioning to ground out the engine ignition longer than a desired predetermined time.

Further objects and advantages of my invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

Fig. 12 is a detail view of a portion of the Fig. 11 mechanism in a further operating position.

While my control may be employed in conjunction with various types and arrangements of motor vehicle transmissions, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by an suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 150 to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker teeth 53 are axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a reciprocatory member or leader rod 68 which has a rear extension 69 aligned with rod 62.

In carrying out my invention I provide a member which functions to relieve the thrust-application between the teeth of sleeve F and the teeth 49 thereby facilitating movement of the drive-control sleeve F from its engaging relationship into its disengaging relationship with respect to the teeth 49. Where the relief of the thrust-application is effected by momentary interruption of the engine ignition system, this member is preferably in the form of a switch-operator 70 which has a lost-motion connection with the leader rod 68 such that even though the leader rod for any reason fails to complete or even start that part of its thrust transmission to follower 62 which causes releasing movement of sleeve F, then in either of such events the switch-operator may overtravel the leader rod and restore the ignition system to normal operation. This member 70 carries a cam comprising a pair of faces 70$^a$, 70$^b$ and is slidably mounted on the portion 71 of leader rod 68 and capable of movement axially relative thereto within the limits afforded by the front and rear rod shoulders or abutments 71$^a$, 71$^b$. Rod 68 also is formed with a detent which cooperates with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. Latch 73 thus provides a releasable holding means for the rod 68. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the primary terminal of the usual distributor of the ignition system whereby the engine ignition may be momentarily rendered ineffective thereby unloading the torque at sleeve F sufficiently to insure its release by spring 67. This ignition interrupting system is under control of an interrupter switch 78 which is closed by plunger 79 and ball 80′ whenever rod 68 moves from its Fig. 11 position to its Fig. 10 position by reason of the switch-operating member 70. The switch 78 comprises a conductor bridge piece 179 carried by cup 279 which retains the spring seat 379 carried at the outer end of plunger 79. A spring 479 forms a yielding connection between cup 279 and seat 379 so that when ball 80′ moves upwardly the bridge piece 179 electrically connects the terminals of the switch, the spring 479 yielding to accommodate any excess of movement of the ball beyond that required to engage the bridge piece 179 with the terminals. Ball 80′ is prevented from falling inwardly beyond its position shown in Figs. 10, 11 and 12 by reason of the in-turned seat 579 formed by peening the ball guide inwardly. A spring 679 yieldingly urges the assembly between bridge piece 179 and ball 80′ inwardly to the Fig. 10 position of these parts.

When the latch 73 is released with the parts positioned as in Fig. 11, sleeve F being clutched, the spring 67 operates to close the gap 76 at the lost-motion between rod portion 69 and rod 62. This movement of rod 69 to its position establishing thrust-transmitting relationship with respect to follower rod 62 causes shoulder 71$^a$ to move member 70 with rod 68 such that cam face 70$^b$ acts to close switch 78 and interrupt the ignition system, the ball 80′ just passing over the sharp high point of member 70 so that the ball 80′ engages the outer portion of cam face 71$^a$ with switch 78 still closed. Ordinarily, when the ignition is thus interrupted, thereby relieving the thrust-application at the teeth of sleeve F, spring 67 then causes further movement of rod 69 to thrust on rod 62 and release sleeve F. During this further movement of rod 68, which is usually practically continuous with its movement closing gap 76, shoulder 71$^a$ moves switch-operating member still further rearwardly thereby allowing the ball 80′ to lower along cam face 70$^a$ and open switch 78 to restore the ignition system.

By reason of my invention the ignition system will be restored even though members 68 and 62 do not complete or even start their stroke which imparts releasing movement to sleeve F. Thus, let it be assumed that the sleeve F fails to releasingly move when the rod 68 moves as aforesaid to take up gap 76. When this occurs the ignition is interrupted and ordinarily the engine would be dead. However at this time the ball 80' engages the outer portion of cam face 70ª and the member 70 will then be moved along rod portion 71 to engage shoulder 71ᵇ as shown in Fig. 12 thereby allowing ball 80' to move inwardly and open switch 70 to restore the ignition.

The sliding movement of member 70, accommodated by its lost-motion connection with leader rod 68, is effected by the spring 679 which yieldingly acts to restore the switch operating parts 79 and 80' to their Fig. 10 positions after the switch 79 has been closed. This spring 679 operates to cause ball 80' to cam the member 70 rearwardly so that once the switch is closed it will open independently of movement of rod 68. Likewise when rod 68 returns from its Fig. 10 to its Fig. 11 position, shoulder 71ᵇ forces member 70 to lift ball 80' near the end of its return stroke whereupon spring 679 acts on cam face 70ᵇ to slide member 70 forwardly so as to restore the same to its Fig. 11 position at the time that latch 73 operates to hold rod 68.

The vacuum supply to chamber 74 is under control of solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the break-away being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

The driver operated ignition switch is designated at L and comprises a conductor 96 which, in the Fig. 10 position showing the switch "on" or closed, electrically connects contacts 97 and 98. Contact 97 extends by conductor 99 to ammeter 100 and thence by conductor 101 to the usual storage battery 102 and thence to ground 103. Contact 98 has a conductor 104 extending therefrom to the engine ignition system herein shown in part as comprising coil 105 and distributor 106 having a primary terminal 107.

A second conductor 108 extends from contact 98 to the solenoid H and thence by conductor 109 to one terminal of ignition interrupter switch 78, the other terminal extending by a grounding conductor 110 to the primary terminal 107 of the distributor 106.

Branching from conductor 109 are two conductors 111 and 112, the former extending to governor switch 94 and thence to ground 113. Conductor 112 extends to kickdown switch 114 and thence to ground 115. The switch 114 is normally open and is closed preferably by a full depression of accelerator pedal 50' acting through link 116 and a bell-crank lever 116ª pivotally mounted at 116ᵇ. Lever 116ª actuates a link 116ᶜ which extends forwardly to adjust the engine throttle valve lever 117. When pedal 50' is thus depressed, the lever 117 is positioned to fully open the throttle valve 118 and as the throttle valve is adjusted in its wide-open range the lever 116ª closes switch 114 to effect a step-down in the transmission from fourth to third or from second to first by energizing the solenoid H.

The governor solenoid circuit is as follows: ground 103 to battery 102 thence by conductor 101 to ammeter 100 and by conductor 99 to ignition switch L. From switch L this circuit extends through conductor 108 and solenoid H and thence by conductors 109 and 111 to switch 94 and ground 113.

The kickdown solenoid circuit is the same as the governor solenoid circuit to conductor 109 whence this circuit extends by conductor 112 to kickdown switch 114 and ground 115.

The engine ignition circuit is the same as the governor solenoid circuit up to the ignition switch L whence this circuit extends by conductor 104 to coil 105 and distributor 106.

The ignition grounding circuit under control of interrupter switch 78 extends from the distributor 106 through conductor 110 to interrupter switch 78. From switch 78 this grounding circuit extends through conductor 109 and thence to a suitable ground. In the illustrated arrangement this ground is provided either at 115 through conductor 112 and kickdown switch 114 or else at 113 through conductor 111 and governor switch 94.

In the aforesaid Neracher et al. application there is set forth certain circumstances under which the transmission becomes locked-up, with sleeves F and 42 clutched and under torque load, and with gap 76 taken up so as ordinarily to render the engine ignition inoperative. With my invention the ignition system is automatically restored under such conditions making it possible for the engine to operate to drive the car and to unload the teeth of sleeve F so that the same may then be released by spring 67. The switch-operating member 70 is always carried in "over center" relationship with respect to ball 80' when leader member 68 moves to take up gap 76 so that if the member 68 travels no further, or a slight amount further, member 70 will overtravel rod 68 and switch 78 will open to restore the ignition system to normal operation as aforesaid.

In the operation of the mechanism, the car at standstill and with the ignition switch L closed and the engine idling will cause the solenoid H to be energized as in Fig. 10 because governor switch 94 is closed thereby establishing the governor solenoid circuit. Cylinder 74 is vented and sleeve F disengaged. The driver shifts sleeve 42 to either the high or low range and accelerates the car ordinarily above the critical speed of governor J thereby causing switch 94 to open to break the governor solenoid circuit. As vacuum builds up in the engine intake manifold K, plunger 80 now being lowered by spring 83 because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 114 closes thereby energizing the kick-down solenoid circuit and causing solenoid H to raise plunger 80 and release latch 73 thereby venting chamber 74. At this time the sleeve F is under driving torque from the engine operating under wide open throttle. However, when latch 73 is released, spring 67 operates rod 68 rearwardly sufficiently to close gap 76 thereby closing the interrupter switch 78 and causing the ignition grounding circuit to ground the engine ignition system. This relieves the torque at sleeve F and spring 67 ordinarily operates to release the sleeve whereupon the ignition is restored at member 70 and the engine quickly speeds up to engage overrunning clutch E for establishing the third or first driving ratio depending on the setting of sleeve 42 prior to the kickdown operation. If the ignition is not restored by full movement of member 68 then, as aforesaid, member 70 will operate to restore the ignition and prevent a dead engine condition.

On bringing the car to a stop when sleeve F is clutched as in fourth for example, the governor J opens governor switch 94 so as to de-energize solenoid H, vent chamber 74 and cause release of sleeve F so that the car will be started in third, assuming the manual sleeve 42 to be left in its forward high range shift position. Here again, member 70 will overtravel rod 68 if for any reason the sleeve F fails to release.

I claim:

1. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a switch-operating member having a lost-motion connection with said reciprocatory member and adapted for movement to cause operation of switch from its said first position to its said second position as an incident to movement of said reciprocatory member from its said first position toward its said second position; said lost-motion connection being adapted to accommodate movement of said switch-operating member relative to said reciprocatory member so as to cause operation of said switch from its said second position to its said first position and thereby restore said ignition system independently of completion of the movement of said reciprocatory member into its said second position.

2. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a switch-operating member slidably mounted on said reciprocatory member and having a portion thereof engaged by a portion of said reciprocatory member to cause said switch-operating member to operate said switch from its said first position to its said second position as an incident to movement of said reciprocatory member from its said first position toward its said second position; said slidable mounting being adapted to accommodate movement of said switch-operating member relative to said reciprocatory member so as to cause operation of said switch from its said second position to its said first position and thereby restore said ignition system independently of completion of the movement of said reciprocatory member into its said second position.

3. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a spring yieldingly urging operation of said switch from its said second position to its said first position; a switch-operating member having a lost-motion connection with said reciprocatory member and adapted for movement to operate said switch from its said first position to its said second position as an incident to movement of said reciprocatory member from its said first position toward its said second position; said lost-motion connection being adapted to accommodate movement of said switch-operating member relative to said reciprocatory member such that said spring is allowed to operate said switch from its said second position to its said first position and thereby restore said ignition system independently of completion of the movement of said reciprocatory member into its said second position.

4. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged between being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a spring yieldingly urging operation of said switch from its said second position to its said first position; a cammed switch-operating member slidably mounted on said reciprocatory member and having a portion thereof engaged by a portion of said reciprocatory member to cause said switch-operating member to operate said switch from its said first position to its said second position as an incident to movement of said reciprocatory member from its said second position; said slidable mounting being adapted to accommodate sliding movement of said switch-operating member in the last said direction of movement of said reciprocatory member and relative to said reciprocatory member so as to allow said spring to operate said switch from its said second position to its said first position and thereby restore said ignition system independently of completion of the movement of said reciprocatory member into its said second position.

5. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member operably connected to said movable element; a leader member adapted for thrust-imparting movement to actuate said follower member thereby to move said movable element into said disengaging relationship; an ignition system for said engine adapted to be interrupted to relieve said thrust application; a switch operable to control said ignition system and adapted for operation from a first position accommodating operation of said ignition system to a second position interrupting said ignition system; a switch operating member having a lost-motion connection with said leader member and adapted for movement to cause operation of said switch from its said first position to its said second position as an incident to thrust-imparting movement of said leader member; said lost-motion connection being adapted to accommodate movement of said switch-operating member relative to said leader member so as to cause operation of said switch from its said second position to its said first position and thereby restore said ignition system independently of such thrust-imparting movement of said leader member as is necessary to move said movable element into said disengaging relationship.

6. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member operably connected to said movable element; a leader member adapted for thrust-imparting movement to actuate said follower member thereby to move said movable element into said disengaging relationship; an ignition system for said engine adapted to be interrupted to relieve said thrust application; a switch operable to control said ignition system and adapted for operation from a first position accommodating operation of said ignition system to a second position interrupting said ignition system; a switch operating member having a lost-motion connection with said leader member, said lost-motion connection accommodating thrust-imparting movement of said leader member relative to said follower member so as to cause said switch to move from its said first position to its said second position and then to its said first position thereby interrupting and restoring said ignition system.

7. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; means operably connecting said reciprocatory member with said movable drive-control for transmitting thrust from said reciprocatory member to said movable drive-control element thereby to effect said disengaging relation of said elements; an ignition system for said engine adapted to be interrupted to relieve said thrust-application; and ignition circuit controlling means comprising a switch operator adapted for actuation in response to movement of said reciprocatory member from its first said position toward its said second position, while said movable element remains in its said engaging relationship, for interrupting said ignition system and then restoring the same.

8. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; means operably connecting said reciprocatory member with said movable drive-control for transmitting thrust from said reciprocatory member to said movable drive-control element thereby to effect said disengaging relation of said elements; an ignition system for said engine adapted to be interrupted to relieve said thrust-application; and ignition circuit controlling means comprising a switch operator adapted for actuation in response to movement of said reciprocatory member from its first said position toward its said second position, without attendant disengaging movement of said movable element, for interrupting and then restoring said ignition system.

9. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a switch-operating member having a lost-motion connection with said reciprocatory member and adapted for movement to cause operation of switch from its said first position to its said second position as an incident to movement of said reciprocatory member from its said first position toward its said second position; said lost-motion connection being adapted to accommodate movement of said switch-operating member relative to said reciprocatory member so as to cause operation of said switch from its said second position to its said first position and thereby restore said ignition system independently of disengaging movement of said movable element.

10. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a switch-operating member having a lost-motion connection with said reciprocatory member and adapted for movement to cause operation of switch from its said first position to its said second position as an incident to movement of said reciprocatory member from its said first position toward its said second position; said lost-motion connection being adapted to accommodate movement of said switch-operating member relative to said reciprocatory member so as to cause operation of said switch from its said second position to its said first position and thereby restore said ignition system while said movable element remains in its said engaging relationship.

11. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; an ignition system for said engine adapted to be interrupted to relieve said thrust-application; a switch operable to control said ignition system and adapted when operated from a first to a second position thereof to interrupt said ignition system; a spring yieldingly urging operation of said switch from its said second position to its said first position; a switch-operating member having a lost-motion connection with said reciprocatory member and adapted for movement to operate said switch from its said first position to its said second position as an incident to movement of said reciprocatory member from its said first position toward its said second position; said lost-motion connection being adapted to accommodate movement of said switch-operating member relative to said reciprocatory member such that said spring is allowed to operate said switch from its said second position to its said first position and thereby restore said ignition system while said movable element remains in its said engaging relationship.

12. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member operably connected to said movable element; a leader member adapted for thrust-imparting movement to actuate said follower member thereby to move said movable element into said disengaging relationship; an ignition system for said engine adapted to be interrupted to relieve said thrust application; a switch operable to control said ignition system and adapted for operation from a first position accommodating operation of said ignition system to a second position interrupting said ignition system; a switch operating member having a lost-motion connection with said leader member and adapted for movement to cause operation of said switch from its said first position to its said second position as an incident to thrust-imparting movement of said leader member; said lost-motion connection being adapted to accommodate movement of said switch-operating member relative to said leader member so as to cause operation of said switch from its said second position to its said first position and thereby restore said ignition system independently of disengaging movement of said movable element.

13. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member operably connected to said movable element; a leader member adapted for thrust-imparting movement to actuate said follower member thereby to move said movable element into said disengaging relationship; an ignition system for said engine adapted to be interrupted to relieve said thrust application; a switch operable to control said ignition system and adapted for operation from a first position accommodating operation of said ignition system to a second position interrupting said ignition system; said leader member having a lost-motion connection with said follower member; a switch operating member having a lost-motion connection with said leader member; the first said lost-motion connection being so arranged as to accommodate movement of said leader member relative to said follower member thereby causing said switch operating member to move said switch from its said first position to its said second position; the second said lost-motion connection being so arranged as to accommodate movement of said switch operating element relative to said leader and follower members sufficiently to cause said switch to move from its said second position to its said first position.

14. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member having a thrust-receiving portion operably connected to said movable element; a leader member having a thrust-imparting portion adapted to transmit thrust to the thrust-receiving portion of said follower member; thrust-applying means for said leader member operable to cause thrust of said follower member so as to move said movable element into said disengaging relationship; means operable to retract said leader member in lost motion relationship with respect to said follower member such that said thrust-applying means will move said leader member relative to said follower member in taking up said lost motion until said thrust-transmitting relationship is established; an ignition system for said engine adapted to be interrupted to relieve said thrust-application; a switch operable to control said ignition system and adapted for operation from a first position accommodating operation of said ignition system to a second position interrupting said ignition system; and switch operating means adapted to move with said leader member, during establishment of said thrust-transmitting relationship as aforesaid, to operate said switch from its said first position to its said second position; said switch operating means having a lost-motion connection with said leader member so as to accommodate movement of said switch operating means to cause said switch to operate from its said second position to its said first position independently of completion of the thrust-applying movement of said leader member sufficient to effect said disengaging relationship of said movable element.

15. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member having a thrust-receiving portion operably connected to said movable element; a leader member having a thrust-imparting portion adapted to transmit thrust to the thrust-receiving portion of said follower member; thrust-applying means for said leader member operable to cause thrust of said follower member so as to move said movable element into said disengaging relationship; means operable to retract said leader member in lost-motion relationship with respect to said follower member such that said thrust-applying means will move said leader member relative to said follower member in taking up said lost motion until said thrust-transmitting relationship is established; an ignition system for said engine adapted to be interrupted to relieve said thrust-application; a switch operable to control said ignition system and adapted for operation from a first position accommodating operation of said ignition system to a second position interrupting said ignition system; and switch operating means adapted to move with said leader member, during establishment of said thrust-transmitting relationship as aforesaid, to operate said switch from its said first position to its said second position; said switch operating means having a lost-motion connection with said leader member so as to accommodate movement of said switch operating means to cause said switch to operate from its said second position to its said first position while said leader member remains in its said position of establishing thrust-transmitting relationship with respect to said follower member.

16. In a drive for a motor vehicle according to claim 15 wherein yielding means is provided to bias said follower member into position corresponding to movement of said movable element into its said disengaging relationship; and wherein the thrust-applying means for the leader member comprises yielding means acting in opposition to the first said yielding means.

17. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a follower member having a thrust-receiving portion operably connected to said movable element; a leader member having a thrust-imparting portion adapted to transmit thrust to the thrust-receiving portion of said follower member; thrust-applying means for said leader member operable to cause thrust of said follower member so as to move said movable element into said disengaging relationship; means operable to retract said leader member in lost-motion relationship with respect to said follower member such that said thrust-applying means will move said leader member relative to said follower member in taking up said lost motion until said thrust-transmitting relationship is established; an ignition system for said engine adapted to be interrupted to relieve said thrust-application; and ignition circuit controlling means comprising switch controlling means adapted for actuation in response to movement of said leader member in taking up said lost motion for interrupting said ignition system and then restoring the same.

18. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; means operable to effect relief of said thrust-application; a switch operable to control said relief means and adapted when operated from a first to a second position thereof to effect said relief of thrust-application; a switch-operating member having a lost-motion connection with said reciprocatory member and adapted for movement to cause operation of switch from its said first position to its said second position as an incident to movement of said reciprocatory member from its said first position toward its said second position; said lost-motion connection being adapted to accommodate movement of said switch-operating member relative to said reciprocatory member so as to cause operation of said switch from its said second position to its said first position independently of completion of the movement of said reciprocatory member into its said second position.

19. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a reciprocatory member for controlling movement of said movable drive-control element and adapted for movement from a first position accommodating said engaging relationship of said elements into a second position causing said disengaging relationship of said elements; means operably connecting said reciprocatory member with said movable drive-control for transmitting thrust from said reciprocatory member to said movable drive-control element thereby to effect said disengaging relation of said elements; means operable to effect relief of said thrust-application; means controlling operation of said relief means, comprising a switch operator adapted for actuation in response to movement of said reciprocatory member from its first said position toward its said second position, while said movable element remains in its said engaging relationship, for effecting said relief of thrust-application and then restoring said thrust-application.

AUGUSTIN J. SYROVY.